US008444196B2

(12) United States Patent
Arndt et al.

(10) Patent No.: US 8,444,196 B2
(45) Date of Patent: May 21, 2013

(54) CONSOLE FOR A VEHICLE

(75) Inventors: Stefan Arndt, Wiesbaden (DE);
Matthias Blanck, Kelkeim (DE);
Andreas Dorhoefer, Floersheim (DE);
Uwe Fett, Trebur (DE); Michael Graf,
Leun (DE); Michael Renkel, Nierstein
(DE); Kurt Beyer, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 842 days.

(21) Appl. No.: 12/307,119

(22) PCT Filed: Jun. 22, 2007

(86) PCT No.: PCT/EP2007/005504
§ 371 (c)(1),
(2), (4) Date: Sep. 3, 2009

(87) PCT Pub. No.: WO2008/003406
PCT Pub. Date: Jan. 10, 2008

(65) Prior Publication Data
US 2010/0013256 A1    Jan. 21, 2010

(30) Foreign Application Priority Data

Jul. 1, 2006  (DE) .................... 10 2006 030 476
Dec. 19, 2006  (DE) .................... 10 2006 059 968
Dec. 19, 2006  (DE) .................... 10 2006 059 969

(51) Int. Cl.
*B60R 13/00*         (2006.01)
(52) U.S. Cl.
USPC ............. 296/24.34; 296/37.8; 296/187.05; 296/70

(58) Field of Classification Search
USPC ............. 296/24.34, 37.6, 37.8, 37.1, 187.05, 296/187.12; 70/85; 220/281; 224/400
IPC .................................................. B60N 3/00
See application file for complete search history.

(56) References Cited

U.S. PATENT DOCUMENTS 3,765,715 A    10/1973  Franchini
5,085,481 A *  2/1992  Fluharty et al. ............ 296/37.8
5,338,081 A *  8/1994  Young et al. ............. 296/37.14
(Continued)

FOREIGN PATENT DOCUMENTS

DE    2159313 A1    6/1972
DE    19615320 C1   5/1997
(Continued)

*Primary Examiner* — Glenn Dayoan
*Assistant Examiner* — Pinel Romain
(74) *Attorney, Agent, or Firm* — Ingrassia Fisher & Lorenz, P.C.

(57) ABSTRACT

A console is provided, in particular a central console for a vehicle, having a rail pair for the essentially horizontally displaceable accommodation of inserts of the console between the rails of the rail pair in guides of the rails, as well as a storage space between the inserts and the floor of the vehicle. For such a console, it is provided that the rails are implemented as freestanding brackets, the brackets at least being mounted in the floor of the vehicle, an essentially horizontally situated section of the particular bracket, which is distal from the floor, having at least one guide. Such a console offers high flexibility in regard to the storage space usable in this area with structurally simple design and may be advantageously used both with and also without the inserts in this aspect.

21 Claims, 12 Drawing Sheets

U.S. PATENT DOCUMENTS

| | | | |
|---|---|---|---|
| 5,897,155 A * | 4/1999 | Kerner et al. | 296/37.8 |
| 6,123,377 A | 9/2000 | Lecher et al. | |
| 6,921,118 B2 * | 7/2005 | Clark et al. | 296/24.34 |
| 7,004,526 B2 * | 2/2006 | Herbold et al. | 296/24.34 |
| 7,396,062 B2 * | 7/2008 | Hung et al. | 296/24.34 |
| 2003/0052500 A1 | 3/2003 | Atanasiu et al. | |
| 2004/0080173 A1 | 4/2004 | Niwa et al. | |
| 2005/0035618 A1 | 2/2005 | Toth et al. | |
| 2010/0230457 A1 | 9/2010 | Beyer | |

FOREIGN PATENT DOCUMENTS

| | | |
|---|---|---|
| DE | 19737739 A1 | 3/1999 |
| DE | 19808381 A1 | 9/1999 |
| DE | 19820337 A1 | 9/1999 |
| DE | 10208886 A1 | 12/2003 |
| DE | 10317538 A1 | 11/2004 |
| DE | 10317901 B3 | 11/2004 |
| DE | 10334999 A1 | 2/2005 |
| DE | 10335046 A1 | 2/2005 |
| DE | 602004001628 T2 | 8/2007 |
| DE | 102008030236 A1 | 12/2009 |
| DE | 102009012736 A1 | 9/2010 |
| FR | 2925869 A1 | 7/2009 |
| GB | 2312189 A | 10/1997 |

* cited by examiner

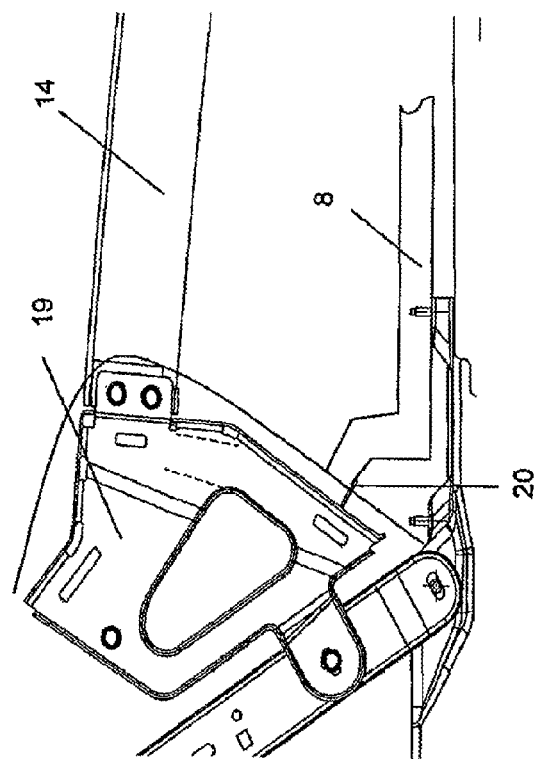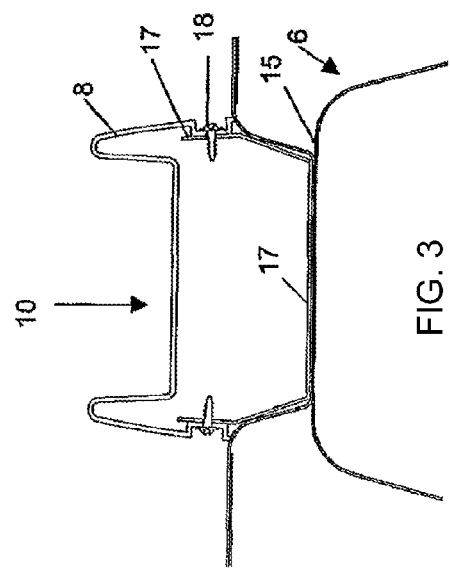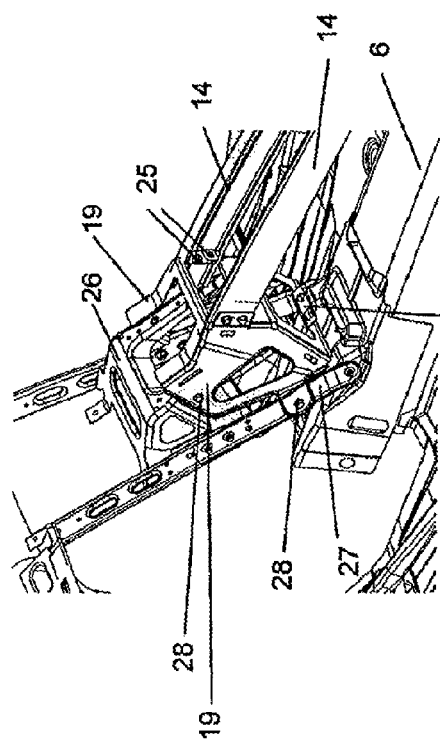

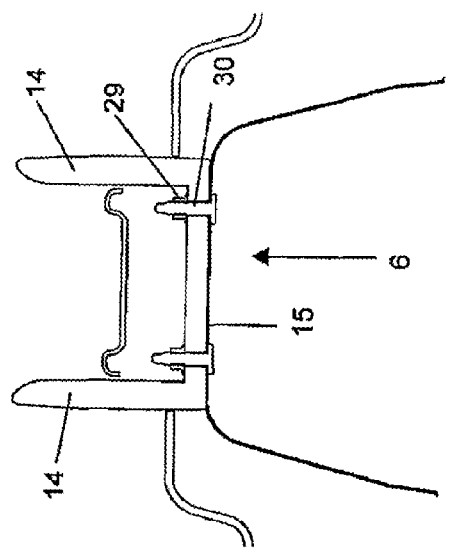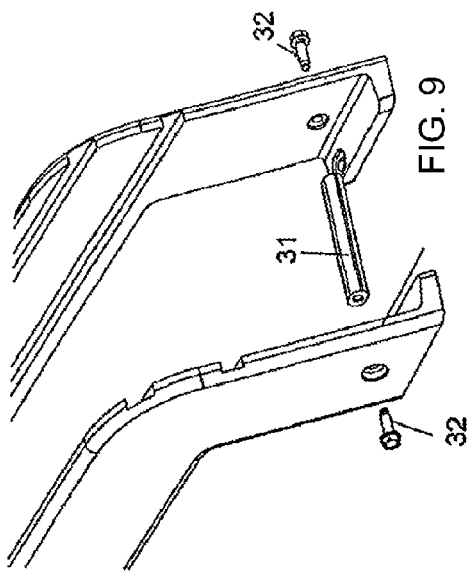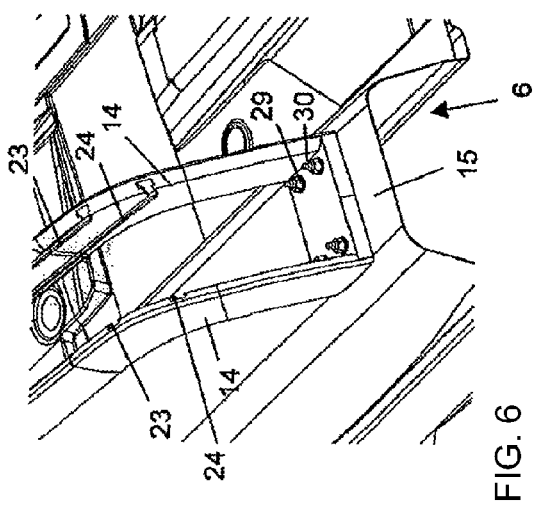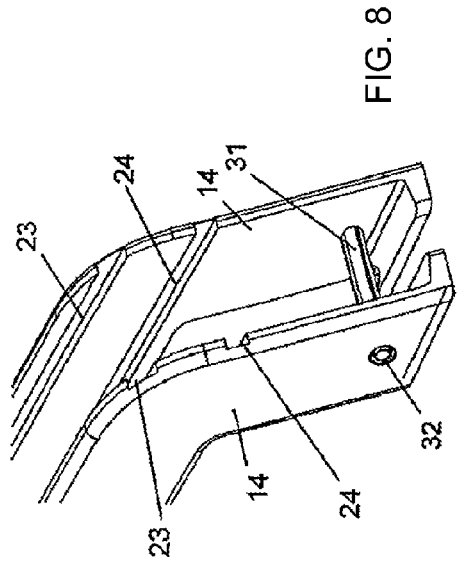

CONSOLE FOR A VEHICLE

CROSS-REFERENCE TO RELATED APPLICATIONS

This application is a U.S. National-Stage entry under 35 U.S.C. §371 based on International Application No. PCT/EP2007/005504, filed Jun. 22, 2007, which was published under PCT Article 21(2), and claims priority to German Application Nos. 102006030476.4, filed Jul. 1, 2006, 102006059969.1, filed Dec. 19, 2006, and 102006059968.3, filed Dec. 19, 2006, which are all hereby incorporated in their entirety by reference.

TECHNICAL FIELD

The invention relates to a console for a vehicle, in particular a central console, having a rail pair for essentially horizontal accommodation of inserts of the console between the rails of the rail pair in guides of the rails, as well as a storage space between the inserts and the floor of vehicle.

BACKGROUND

A console of this type is known from DE 102 08 886 A1. The two rails running in parallel are fastened to the central tunnel of the vehicle therein. Three containers displaceable forward and back, which may be locked in a suitable way in the particular achieved position, are located on the rail line thus formed. The containers may fulfill various functions. For example, they are used to accommodate utensils which the driver requires, such as map material, flashlights, or the like. However, they may also be provided with compartments for accommodating CDs and cassettes. In addition, the particular container may be implemented as a simple plate-like formation, having passages for accommodating beverage cans and the like.

The console is closed to the side, and is thus only open on top. A further storage space is formed between the inserts and the floor of the vehicle, neglecting the storage space in the inserts. A concrete embodiment of the console is designed in such a way that the inserts terminate on top essentially with the rails, and thus extend significantly below the rail level. As a result, only a small space remains between the inserts on the floor of the vehicle as a further storage space. If no inserts are accommodated by the rails, a single, larger storage space results inside the console, which is only accessible from the top.

Furthermore, consoles for vehicles in which inserts are displaceably mounted are known from U.S. Pat. No. 6,547,299 B2 and JP 2000255323A.

A modularly constructed central console for a motor vehicle is described in DE 197 37 739 A1. It comprises multiple modularly situated functional elements, such as a gear selection lever or shift lever, a hand brake lever, selection switches for power windows or heated seats, beverage holders, and a storage trough. To make the production and mounting of the central console on a central tunnel of a motor vehicle easier and allow an arbitrary configuration of the functional elements and an exchange of individual or multiple functional elements, separately implemented, similar connection elements are situated between the functional elements. These connection elements connect two adjacent functional elements or parts thereof to one another and are additionally used for fastening the central console on the central tunnel. These connection elements are formed by identical long partial pieces of an extruded profile.

A multifunction console for a vehicle, in particular for the rear bench seat of a passenger automobile, is known from DE 198 08 381 A1. To produce a specific console adapted in each case to different, individual vehicle types and vehicle models, a building block system is provided. It comprises base blocks and vehicle-individual fastening parts, each connectable to at least one base block.

In view of the foregoing, at least one object of the present invention is to refine a console of the type cited at the beginning in such a way that it offers high flexibility in regard to the storage space usable in this area with a structurally simple design, and may advantageously be used in this aspect both with and also without inserts. In addition, other objects, desirable features and characteristics will become apparent from the subsequent summary and detailed description and the appended claims, taken in conjunction with the accompanying drawings and this background.

SUMMARY

The at least one object, other objects, desirable features and characteristics, are achieved in that the rails are implemented as freestanding brackets, the brackets being mounted at least in the floor of the vehicle, an essentially horizontally situated section of the particular bracket distal from the floor having at least one guide.

In the console according to an embodiment of the invention, the mounting of the particular inserts thus has a very simple structural design. The mounting is performed in the brackets, these brackets not only having the task of being used to guide the inserts, but rather the brackets also representing the supporting part of the inserts, the brackets being mounted fixed in the vehicle. This mounting of the brackets is performed at least in the floor of the vehicle. This means that this mounting area of the brackets lies lower than the area in which the guides of the brackets are provided.

This described mounting of the brackets relates at least to one end of the particular bracket, in particular to the rear bracket end in relation to the orientation of the vehicle. The front end of the particular bracket is preferably fastened to a part of the vehicle which is located significantly above the floor level of the vehicle. In particular the fastening of the front end of the particular bracket in a retainer for the dashboard of the vehicle or in a retainer for a cover of a shift lever and/or selection lever of the vehicle is considered. In particular, this design allows the particular bracket to be implemented having a very simple geometry, essentially in the form of a rounded L, thus having a long section, which has the least one guide, and a short section, which bridges the distance between the section of the bracket having the guide and the floor of the vehicle. The free end of the long section is connected to the retainer for the dashboard or that for the shift lever/selection lever, and the free end of the short section of the bracket is fastened to the floor of the vehicle. Notwithstanding this, the front end of the particular bracket may certainly also be mounted in the floor. In this case, the bracket is designed as essentially U-shaped.

According to a special embodiment of the invention, the particular bracket has two guides situated one above another for accommodating inserts at different levels. This allows the console to be equipped variably. For example, one insert may be used which has a greater overall height and which extends down into the area below the lower guide upon mounting in the upper guide. Inserts of less overall height may also be used, such an insert, when it is retained in the upper guide, not reaching the area of the lower guide, but rather the other insert of less overall height being provided in this area. A combination between inserts of greater overall height and inserts of less overall height is certainly also possible.

The particular guide is open in particular in an upper end area of the assigned rail. The possibility thus exists of inserting the particular insert from the rear into the guide, specifically in the area of the particular bracket in which it is curved because of its rounded L-shape. This design thus allows the particular insert to be removed from the brackets and/or the console to be equipped with the inserts easily. This contributes significantly to increasing the flexibility of the console. Means are expediently provided for locking the inserts in relation to the guides. A more secure hold of the inserts during travel is thus ensured.

The brackets preferably comprise metal or plastic. A material combination made of metal and plastic is also entirely conceivable.

As a result of the design of the console according to the embodiment of the invention having the freestanding brackets, which are used for accommodating the inserts, a variable use of the vehicle in the area of the console is possible. If no inserts are inserted into the brackets, the space used by the bracket is only represented as a configuration of the two freestanding brackets, which are connected at least to the floor, in particular to the floor and the retainers for the dashboard and/or shift lever/selection lever. As a result, objects may be introduced into this space, such as a pair of skis which is laid between the two brackets. On the other hand, the space which is enclosed by the two brackets is also freely accessible from the side, and is thus accessible both to the driver and also to the passenger if the console is situated between the front seats of the vehicle. If the console is equipped with one or more inserts, they are also well accessible and offer an optimum storage space for greatly varying objects. The further storage space formed below the inserts is also well accessible, in particular from the side, because the rails are designed as freestanding brackets.

According to a special refinement of an embodiment of the invention, the console has a base support, which is mounted in the floor, in particular fastened thereto. This base support is thus situated in the lower area of the console, between the freestanding brackets situated laterally thereto. While the main function of the brackets comprises accommodating the inserts, the main function of the base support is to conceal electrical or other components which run on the floor and/or along the central tunnel. Furthermore, the base body may be used as a storage space. The base body follows the floor structure and the electrical components. Depressions thus arise which may be used as placement surfaces. Depending on the shaping, greatly varying dispositions are obtained: round as a cup holder or retainer for the ashtray, webs for accommodating CDs, etc. The compartments may additionally be provided with a cover having a simple lid or a roll-up blind.

The inserts form the actual storage space adjacent to the base support. Depending on the embodiment and division, various usage types may be employed, which are particularly adapted concretely to the user group. It is conceivable to provide an office box, a box for children, in particular having toys, a box for childcare, a box for smokers, and also inserts which are designed more simply and are used in particular to accommodate spectacles, CDs, or as a cup holder. Finally, it is conceivable to provide inserts having electrical terminals, for example, an electrical cooler. The individual inserts/boxes may in turn contain a lid or a roll-up blind to form a closed space, which may additionally be secured using a lock. The inserts have guides which prevent them from springing out. Depending on the catch system, at least one fastening mechanism is provided for locking the inserts. For example, this has a pushbutton for locking and unlocking. The inserts may be represented having a simple wall or as solids having a double wall.

The console having the brackets on the side and in particular two guides situated one above another in the brackets offers the following flexibility: if no insert is inserted, the base support is used as a storage space for large objects, such as handbags; loading through longer objects, such as skis, is also possible. If small inserts are retained in the brackets, they may be situated one behind another or also one above another. If large inserts are accommodated, they may be situated one behind another. If both large and also small inserts are accommodated using the brackets, small inserts may be situated one above another, in front of or behind a large insert.

In the normal case, the particular bracket has two guides situated one above another. It is fundamentally sufficient if one guide is provided in the particular bracket. However, more than two guides which are situated one above another may certainly be provided in the particular bracket. The rails are expediently connected using screws and nuts.

The embodiments of the invention thus suggest a flexible console which may be entirely adapted to the particular situation. The console offers loading through capability when the inserts are taken out. Large objects may be positioned between the seats as soon as the inserts are removed. If inserts are used, displacement of the inserts on multiple levels allows simultaneous use of all inserts. Large objects may be placed down to the floor and nonetheless inserts may still be used. Storing large, long objects below the inserts is possible.

An expanded functionality of the console is provided if the rail pair is situated between seats of the vehicle and, in the event of a side crash, a load path for forces introduced during the side crash into the vehicle is formed at least by the seat facing toward the crash side of the vehicle, the rails, and at least one of the inserts.

In addition to the functionality of providing storage space, the console has the functionality of a crash element, which increases the crash performance in the interior, between the seats. In the event of a side crash, not only is the load path of the floor group of the vehicle thus active, but rather additionally the load path between the seats. The console ensures that the seats may not significantly approach one another in case of the side crash because of the console situated between the seats by which a hazard to the vehicle occupants in regard to body contact, in particular in regard to the upper bodies and/or heads of the vehicle occupants striking against one another, is effectively reduced.

The second load path in the area of the console formed adjacent to the first load path of the floor group is provided even if the insert is located in a rail position in which it is not situated directly between the seats, but rather possibly in the rear seat area of the vehicle. A certain stability between the rails of the rail pair is also provided in this case, on the one hand because of their mounting in the vehicle, on the other hand because of the insert, which effectively prevents the rails, at a distance to the insert, from being able to be moved toward one another without further measures during a side crash. The best crash performance in the event of a side crash results, however, if the insert is located between the seats.

During a side crash, the energy is thus introduced into the rails of the console, in particular the central console via the seat facing toward the crash side of the vehicle. From there, the energy is transmitted to the insert and relayed via it to the opposite rail. During an especially strong crash event, the energy may be relayed from there to the other seat.

The crash performance may be increased if the individual components of the console are implemented as energy-absorbing and deformable elements. It is thus viewed as expedient if the particular rail is implemented as a chamber profile, in particular as a hollow chamber profile. In particular, if the particular rail is implemented as a hollow chamber profile, a deformation distance is provided inside the profile. If the particular rail is only attached in the front and rear areas, the profile may additionally deflect.

The implementation of the particular insert, which may also be referred to as a module, is also of special significance. The particular insert is preferably implemented as double-walled. A significantly higher rigidity of the insert thus results. It is important that the inserts are not destroyed during the side crash and are mounted in the rail pair so that they do not detach from the rail pair, because otherwise the force flow would be interrupted. According to a preferred embodiment, the particular insert is implemented as shell-shaped, wall areas of the double-walled insert being situated at a distance to one another. The hollow implementation of the insert is thus viewed as advantageous.

The embodiments of the invention accordingly suggests a console which improves the crash performance in the event of a side crash. The floor group, which must otherwise absorb the forces during the side crash alone, may thus be designed as simpler in particular. As a consequence, the floor group may be provided in a material-saving way.

Furthermore, an expanded functionality of the console is provided if the rails are mounted in the area of their rear ends in the floor of the vehicle and are mounted in the area of their front ends in a retainer for the dashboard of the vehicle or in a retainer for a cover of a shift lever or selection lever of the vehicle, the rail pair forming a load path between the retainer and the floor in the event of a frontal crash.

In addition to the functionality of providing storage space, the console has the functionality of a crash element, which increases the crash performance in the interior, in relation to a frontal crash. During a frontal crash, not only is the load path of the floor group of the vehicle thus active, but rather additionally the load path from the retainer to the rail pair and from there to the floor of the vehicle.

According to a preferred embodiment of the invention, at least one of the rails is mounted at the front using a two-part bearing element in the retainer, the two bearing element parts of the bearing element, which are connected to one another, being able to be oriented in two coordinate directions to one another. The possibility exists in this way of a precise orientation of the rail pair and/or the inserts carried by the rail pair in relation to the dashboard. Thus, for example, a recess is provided in the dashboard, into which the inserts may be inserted. Upon an orientation of the rail pair in relation to the dashboard, a perfect slit image to the rail pair and/or to the inserts is to be ensured, which may be caused in a simple way because of the ability to orient the two bearing element parts to one another.

It is viewed as especially advantageous if the two bearing element parts may be oriented to one another in the two coordinate directions perpendicularly to the longitudinal extension of the rails. This may be implemented in an especially simple way by screwing together the two bearing element parts, using oblong holes which allow the relative displacement of the two bearing element parts in the longitudinal direction of one oblong hole as a result of one oblong hole and in the longitudinal direction of the other oblong hole as a result of the other oblong hole.

According to a refinement of an embodiment of the invention, the particular rail is implemented as a chamber profile, in particular a hollow chamber profile. Because of this implementation of the particular rail, the buckling resistance of the rail increases upon the introduction of crash forces, which are essentially introduced in the longitudinal direction of the rail. The particular rail is thus especially capable of introducing forces of this type into the floor of the vehicle in the longitudinal direction of the rails.

The buckling resistance of the rails is further increased in that the inserts are retained in the rails. The rails are thus active as a unit from the aspect of the crash forces introduced therein in the event of a frontal crash. The buckling resistance is quite high in this way because of the bending resistance of the system. It is thus ensured that the rails may introduce forces reliably into the floor of the vehicle in the event of a frontal crash. It is important that the inserts are designed in such a way that they are not destroyed during the frontal crash and are mounted in the rail pair so that they do not detach from the rail pair. An especially high rigidity of the insert results if the particular insert, which may also be referred to as a module, is implemented as double-walled. A high rigidity of the insert thus results. It is especially advantageous if the particular insert is implemented as shell-shaped, wall areas of the double-walled insert being situated at a distance to one another. The wall of the insert is thus implemented as hollow.

The embodiments of the invention accordingly suggest a console which improves the crash performance during the frontal crash. In particular the floor group, which must otherwise absorb the forces during the frontal crash alone, may thus be designed more simply. As a consequence, the floor group may be provided in a material-saving way.

BRIEF DESCRIPTION OF THE DRAWINGS

The embodiments of the invention will hereinafter be described in conjunction with the following drawing figures, wherein like numerals denote like elements, and:

FIG. 3 shows a section through the floor area of the vehicle, in section transversely to its longitudinal extension, to illustrate the rear fastening of the base support on the floor;

FIG. 4 shows a longitudinal section through the vehicle to illustrate the front fastening of the base support in a retainer for paneling of the mounting of the shift/selection lever;

FIG. 5 shows a spatial view of the front fastening area of the two brackets in the retainer for the paneling of the mounting of the shift/selection lever;

FIG. 6 shows a spatial view of the rear fastening of the two brackets on the floor of the vehicle;

FIG. 7 shows a section through the rear fastening area of the two brackets, in section transversely to the longitudinal extension of the vehicle;

FIG. 8 shows a modified design of the two brackets in divided configuration, illustrated with brackets connected to one another;

FIG. 9 shows an illustration of the brackets from FIG. 8, before the two brackets are connected;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
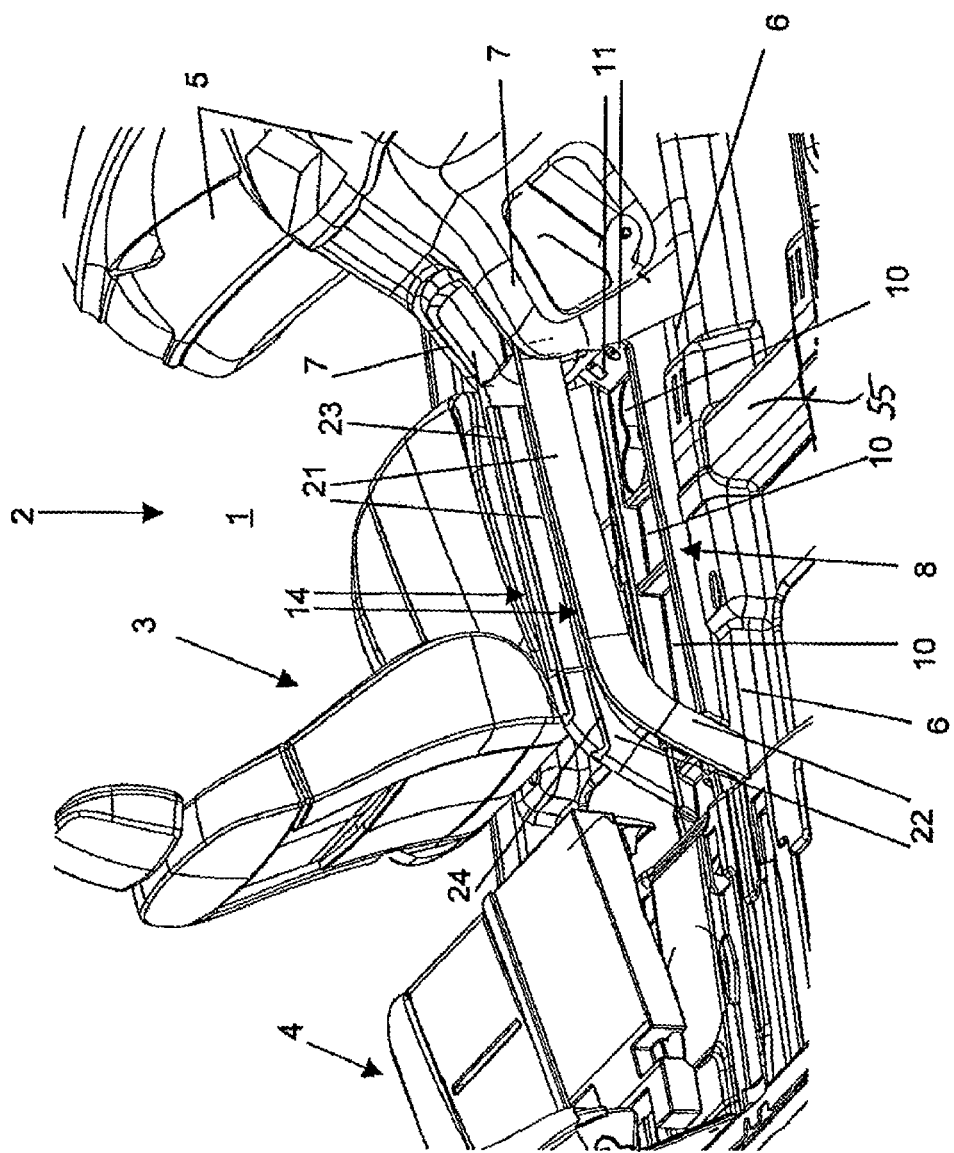
FIG. 1 shows a spatial view of the interior of a passenger automobile having the console according to an embodiment of the invention, however, with inserts not inserted in the brackets.

FIG. 1 illustrates, for the interior 1 of the passenger automobile 2, the driver seat 2 and the partially shown rear seat 4, the dashboard 5, and the panels 7 of the mounting area of the shift/selection lever (not shown) of the vehicle, which is situated above the central tunnel 6 of the vehicle in its front area.

A base support 8 of the console 9 is mounted in the central tunnel 6. The base support 8 extends from the dashboard 5 over the entire central tunnel 6 up to the rear seats 4. The shape is designed so that compartments and divisions, which are identified by the reference numeral 10, result, whereby the base support 8 is able to be used as a base console. The compartments and/or divisions 10 may be compartments for CDs, depressions as cup holders, etc. Receptacles 11 are provided in the front area of the base support 8 for electrical components, such as cigarette lighters, 12 V sockets, USB output, etc. The base support conceals electronic components situated below it, such as crash sensors, cable strands, etc., air guides and air-conditioning ducts for the rear seat, and all other necessary components.

Figure 2:
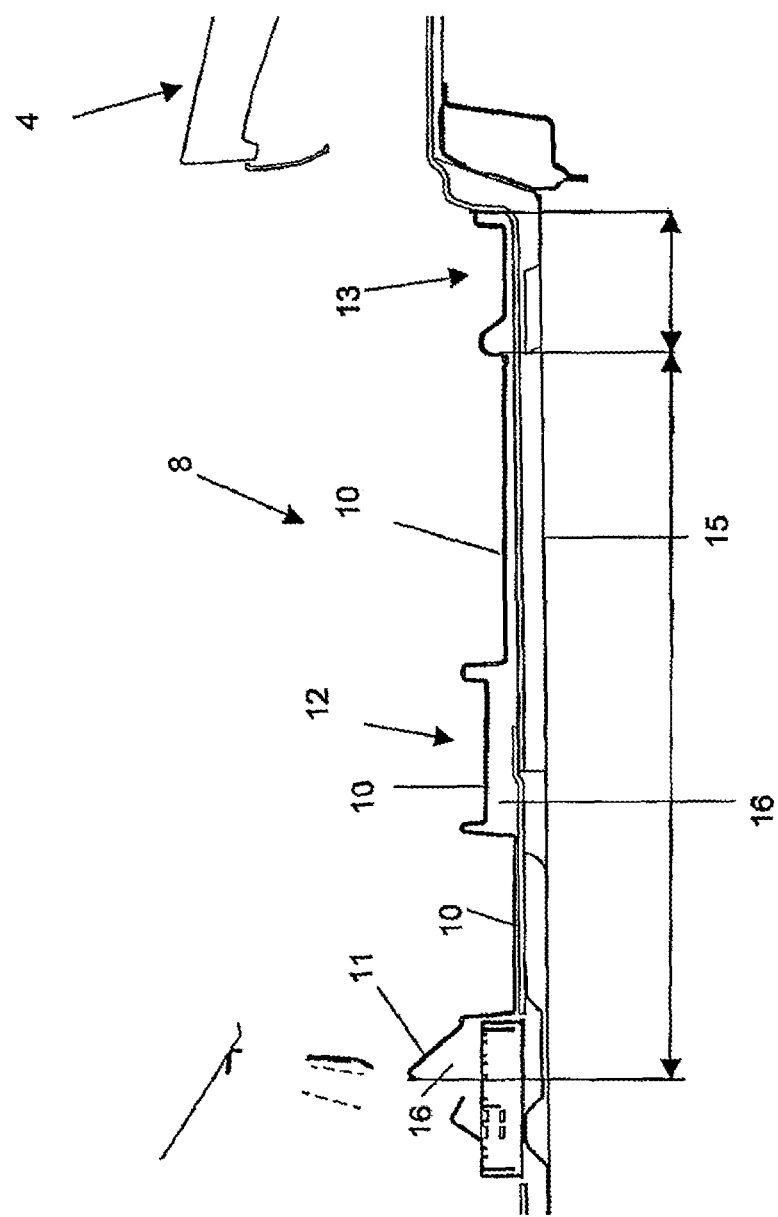
FIG. 2 shows a longitudinal central section through the vehicle in the area of the floor having the base support of the console connected to the floor.

The base support 8 comprises, as may be inferred from the illustration of FIG. 2 in particular, two parts because of the mounting sequence, namely a large, front part 12 of the base support 8 and a short, rear part 13 of the base support 8. The front part 12 is situated below the two brackets 14 of the console, which are to be described in greater detail, and the rear part 13 forms the terminus to the height jump of the floor 15 of the vehicle in the area of the rear seats 4 and covers the rear screw points of the brackets 14, which are to be explained in greater detail. The following mounting sequence thus results: firstly, the front part 12 is mounted, then the two brackets 14, and finally the rear part 13. The individual parts of the base support 8 are fastened by blank holders. The two individual parts 12 and 13 of the base support 8 overlap.

A receptacle space 16 for electronic components, such as crash sensors, is illustrated in FIG. 2 between the front part 12 and the floor 15.

FIG. 3 illustrates the fastening of the base of support 8 on the floor 15. The base support 8 is fastened using blank holders 17 and screws 18. The blank holders 17 may be produced from a relatively thin sheet metal, because they do not have to absorb large forces. The blank holders 17 are welded onto the central tunnel 6, but may also be screwed on. The base support 8 is screwed laterally onto the blank holders 17.

FIG. 4 illustrates the mounting of the base support 8 in the area of its front end in two retainers 19, situated essentially parallel to one another, for paneling of the mounting of the shift/selection lever. As described for the embodiment according to FIG. 3, the front end of the base support 8 is screwed onto the retainer 19. The base support 4 lies on a shoulder 20 of the retainer 19; the screwing occurs there.

As may be inferred from the illustration of FIG. 1 in particular, the central console 6 has the two brackets 14 in addition to the base support 8. The particular bracket is implemented as essentially L-shaped, having a long leg 21 and a short leg 22. The transition between the two legs 21 and 22 is implemented as a curve, so that the legs enclose an obtuse angle with one another. The long leg 21 is situated slightly inclined to the horizontal, having an inclination from the front to the rear. The particular bracket 18 is mounted in the area of the front end of its leg 21 in the retainer 19 in a way to be described in greater detail. The other leg 22 of the particular bracket 14 is connected to the floor 15 in a way also to be described in greater detail.

The particular bracket 14 has two guides, upper guide 23 and lower guide 24, which are situated essentially horizontally and lie one above another, in the area of its leg 21. In the area of its rear end, the guides 23 and 24 are open, so that inserts to be described in greater detail, which may form a component of the console 9, may be inserted into the brackets 14 from the rear toward the front. The particular guide 23 or 24 is thus open in the upper end area of the bracket, accordingly at a distance to the floor 15. Because of the design of the L-shaped bracket 14, a space is formed between the particular bracket 14 and the floor 15 of the vehicle, which is accessible both from the side, accordingly by the driver and also by the passenger, and additionally from above.

The two brackets 14 comprise aluminum. They are attached to the structure at two points, at the front to the dashboard 5 and at the rear to the floor 15. Screws and/or nuts are used for this purpose.

FIG. 5 illustrates the fastening of the brackets in the area of the dashboard concretely on the retainer 19 for the paneling of the mounting of the shift/selection lever.

The two brackets 14 are each fastened to the retainer 19 using two screws 25. The retainer 19 is produced, for example, from aluminum die casting, magnesium die casting, or from sheet metal. The retainer 19 is fastened to the actual retainer 26 of the shift/selection lever and a crash strut 27 using one screw 28 each.

FIG. 6 and FIG. 7 illustrate the fastening of the brackets 13 in their rear area on the floor 15 of the central, 6, the two brackets 14 forming a unit in this embodiment.

This unit is fastened to the central tunnel 6 using nuts 29, which are screwed onto welded studs 30.

FIG. 8 and FIG. 9 illustrate the fastening of the rear end of the two brackets 14 on the floor 15, the brackets 14 not forming a unit, but rather being a divided rail. To ensure the parallelism of the guiding in the brackets 14 and allow the installation of the brackets 14 on a part, they are first connected to one another. This may be performed by a spacer stud 31 having internal thread, into which screws 32 are screwed. The actual connection of the unit of the two brackets 14 thus formed to the floor 15 is performed as described for the embodiment according to FIG. 6 and FIG. 7.

Figure 11:
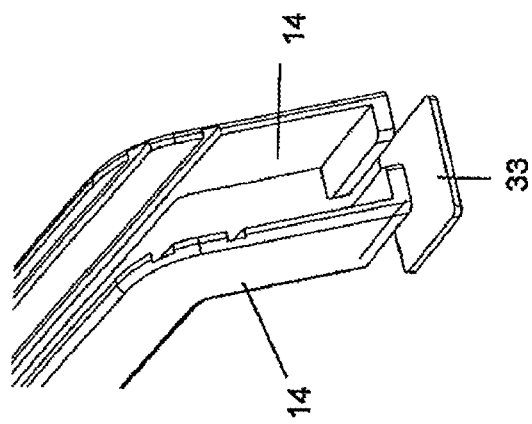
FIG. 11 shows the bracket configuration illustrated in FIG. 10, before the two brackets are connected.
Figure 10:
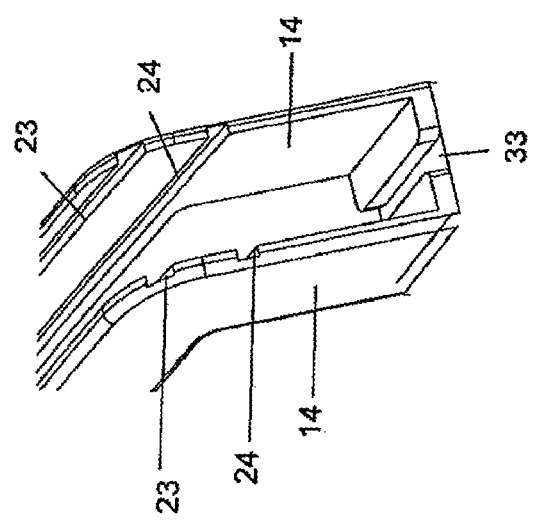
FIG. 10 shows a further design of the divided bracket configuration, with brackets connected to one another.

A further possibility for connecting the two brackets 14 to one another is illustrated in FIG. 10 and FIG. 11. It comprises attaching a connection plate 33 by welding or screws, the precise spacing being maintained during the connection step. The connection of the brackets to the floor 15 is also performed as described for the embodiment according to FIG. 6 and FIG. 7 for this design of the brackets 14.

FIG. 12 through FIG. 15 illustrate additional inserts inserted into the two brackets 14 of the console 9, an upper insert inserted into the upper guides 23 of the brackets 14 being identified by the reference numeral 34, and a lower insert inserted into the lower guides 24 of the brackets 14 being identified by the reference numeral 35.

Figure 12:
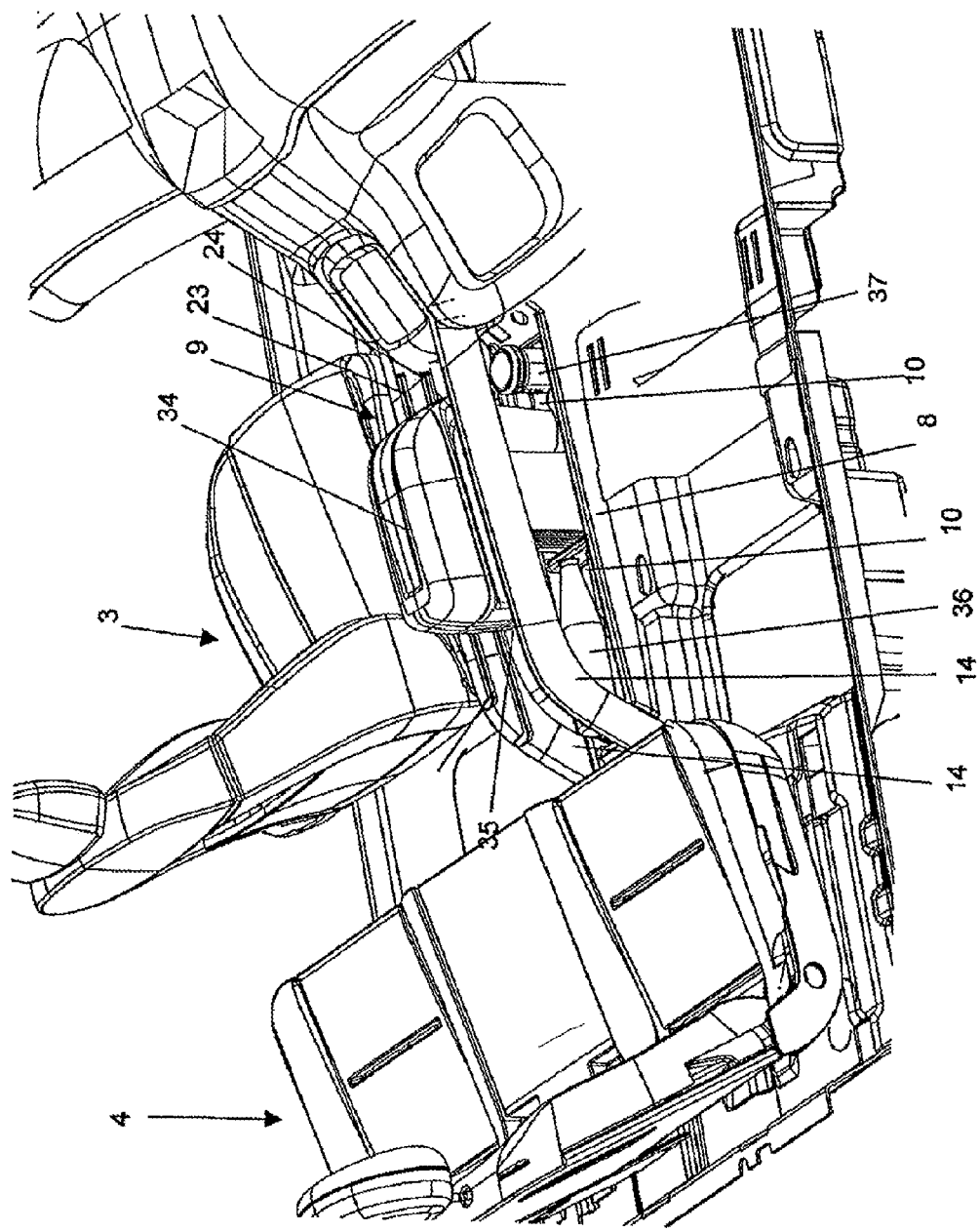
FIG. 12 shows a spatial view of the vehicle interior having console according to the an embodiment of invention with inserted upper and lower inserts.

FIG. 12 shows the upper insert 34 and the lower insert 35 in their position inserted into the brackets 14. The upper insert 34 is positioned precisely above the lower insert 35. The base support 8 is loaded with objects, for example, its compartments/divisions 10 accommodate a bottle 36 and a drum ashtray 37 and/or can, a cup 38, and compact discs 40. Clamping elements of the inserts 34, 35 are not shown, which are used for securely fixing the particular insert in the guides 23 or 24 in any arbitrary position of the insert.

Figure 13:
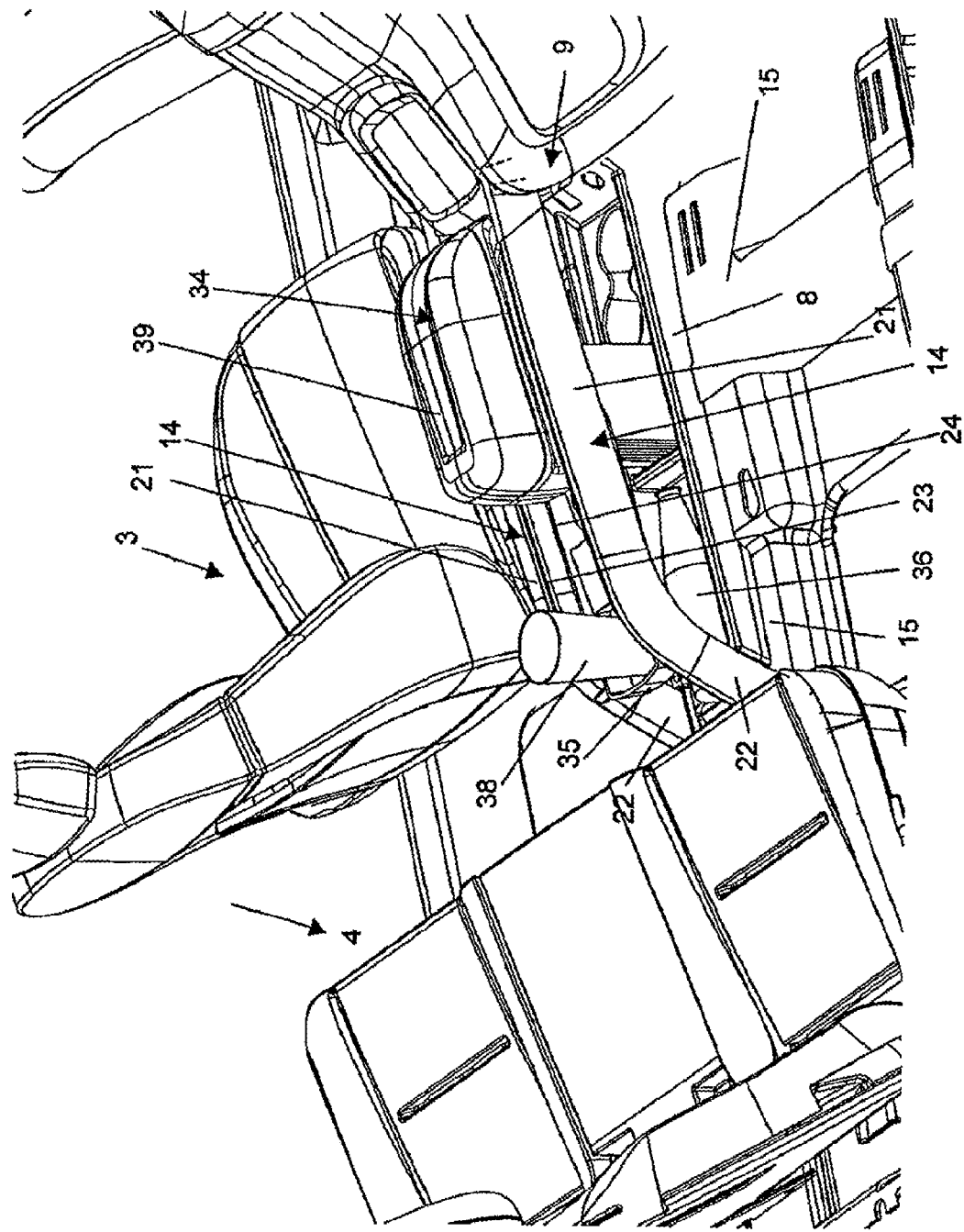
FIG. 13 shows a view according to FIG. 12, also with inserted upper and lower inserts, but in another position of the inserts to one another.

FIG. 13 illustrates the upper and lower inserts 34, 35 inserted into the brackets 14. However, these two inserts 34, 35 are not precisely one above another. Accordingly, both the upper insert 34 and also the lower insert 35 may be reached. A cup 38 is inserted into the lower insert 35, which is open on top and is located in its rear position. The upper insert 34 located in its front position is closed using a lid 39, which may be opened.

Figure 14:
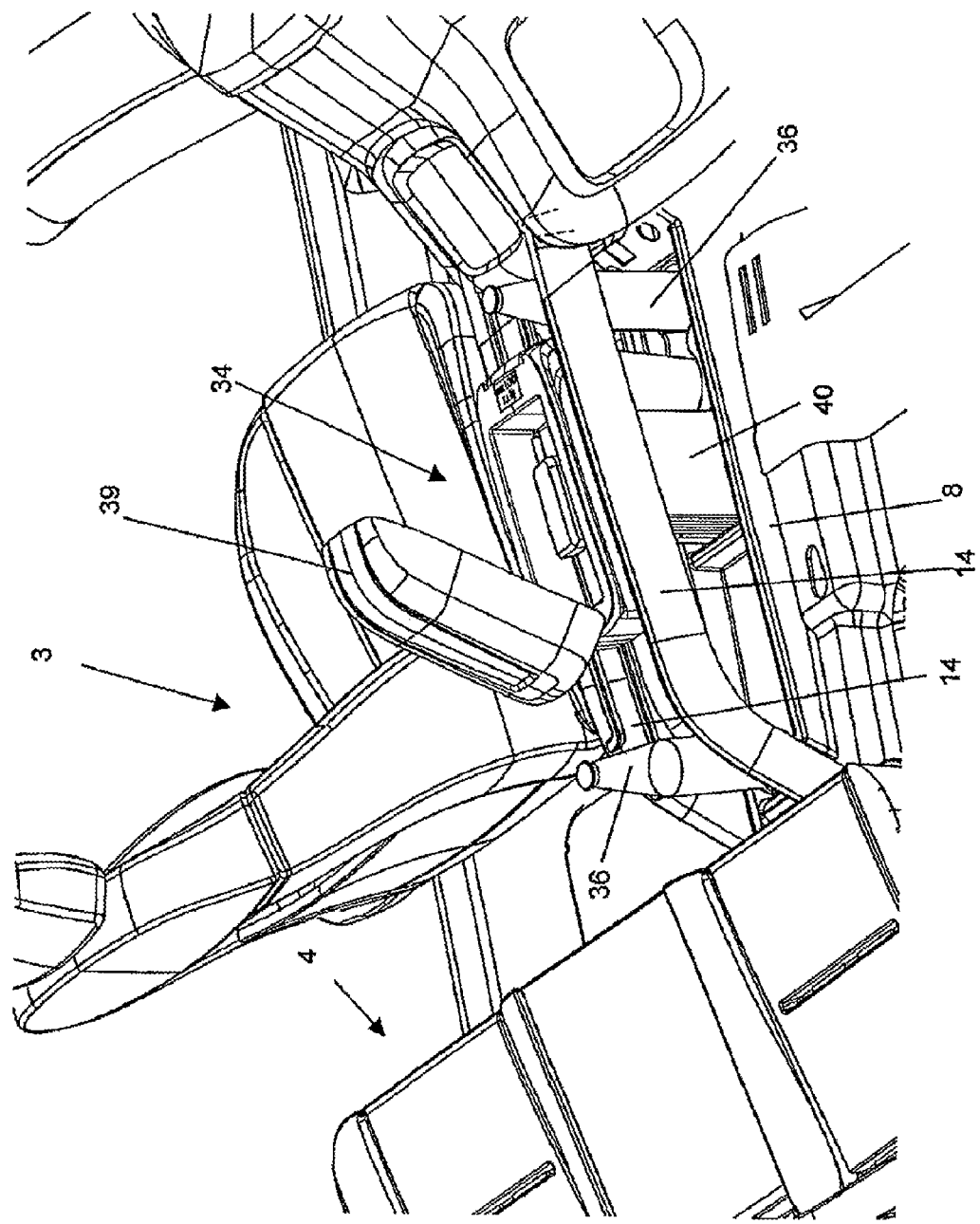
FIG. 14 shows a view according to FIG. 12 and FIG. 13, only with inserted upper insert.

FIG. 14 illustrates a state in which only the upper insert 34, which is illustrated with raised lid 39, is inserted into the two brackets 14. A storage space of greater height of the base support 8 thus remains below this upper insert 34, a storage space thus extending up to the upper edge of the upper insert 34. The central compartment 10 of the base support 8 accommodates a plurality of compact discs 40, for example. Fundamentally, only an upper insert 34 may also be provided, which has a greater height, however, and thus projects into the space which is otherwise occupied by the lower insert 35.

Figure 15:
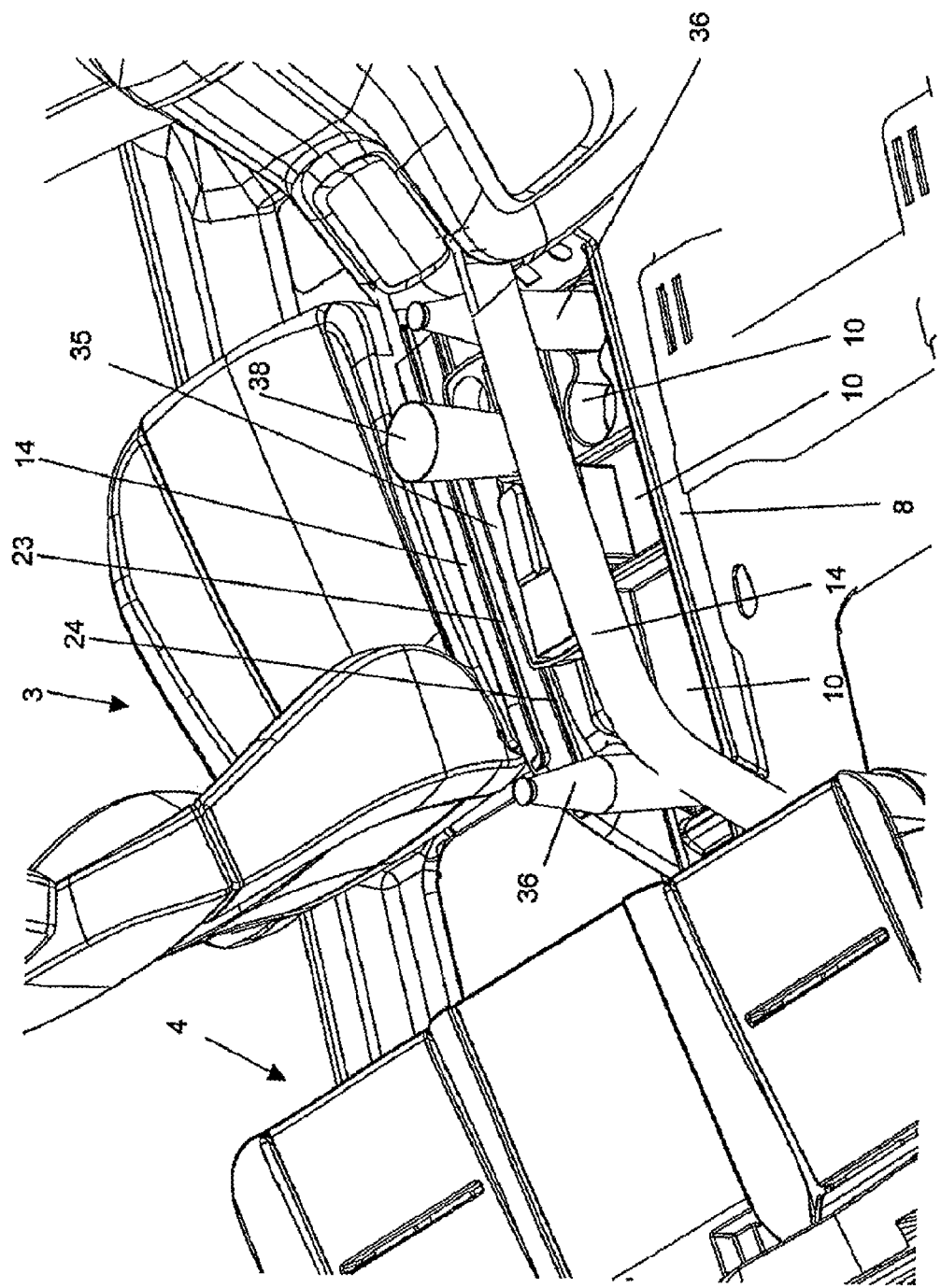
FIG. 15 shows a view according to FIG. 12 through FIG. 14, only with inserted lower insert.

FIG. 15 shows a variant in which only the lower insert 35 is inserted into the brackets 14. The lower insert 35 does not have a lid. The base support 8 is loaded.

Figure 16:
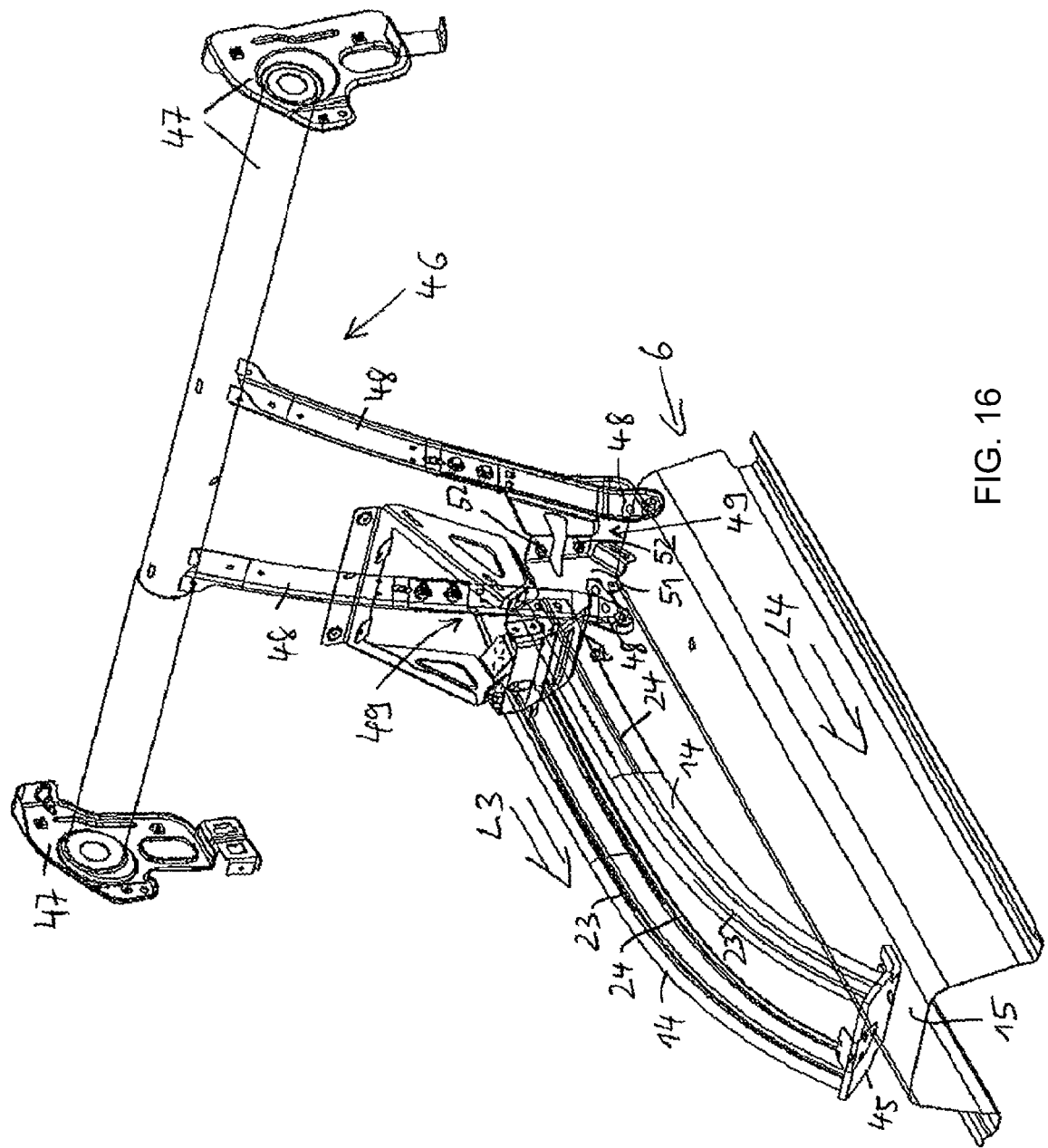
FIG. 16 shows an embodiment in a spatial view, in which the rails are mounted in a retainer for the dashboard in the area of their front ends.
Figure 17:
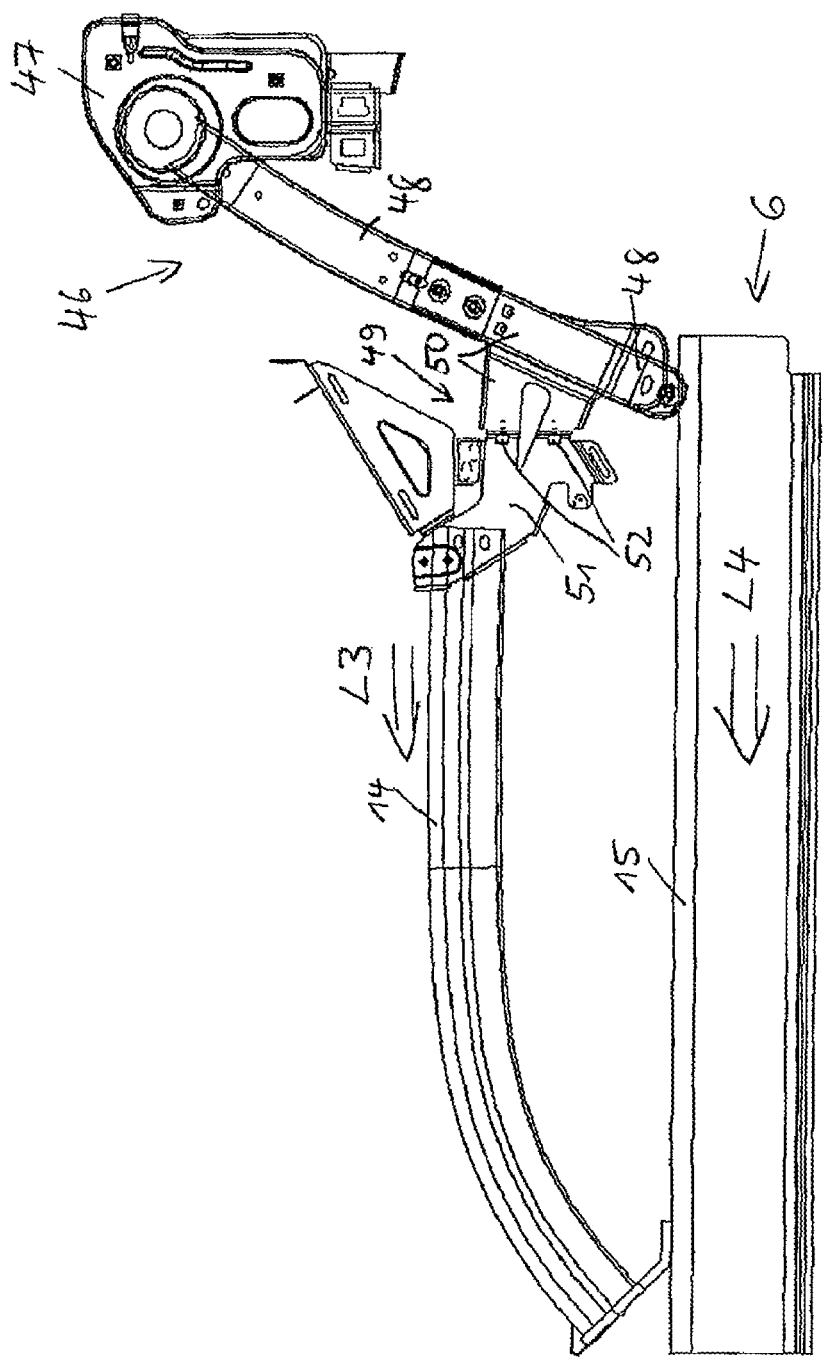
FIG. 17 shows an embodiment according to FIG. 16, in a side view.
Figure 18:
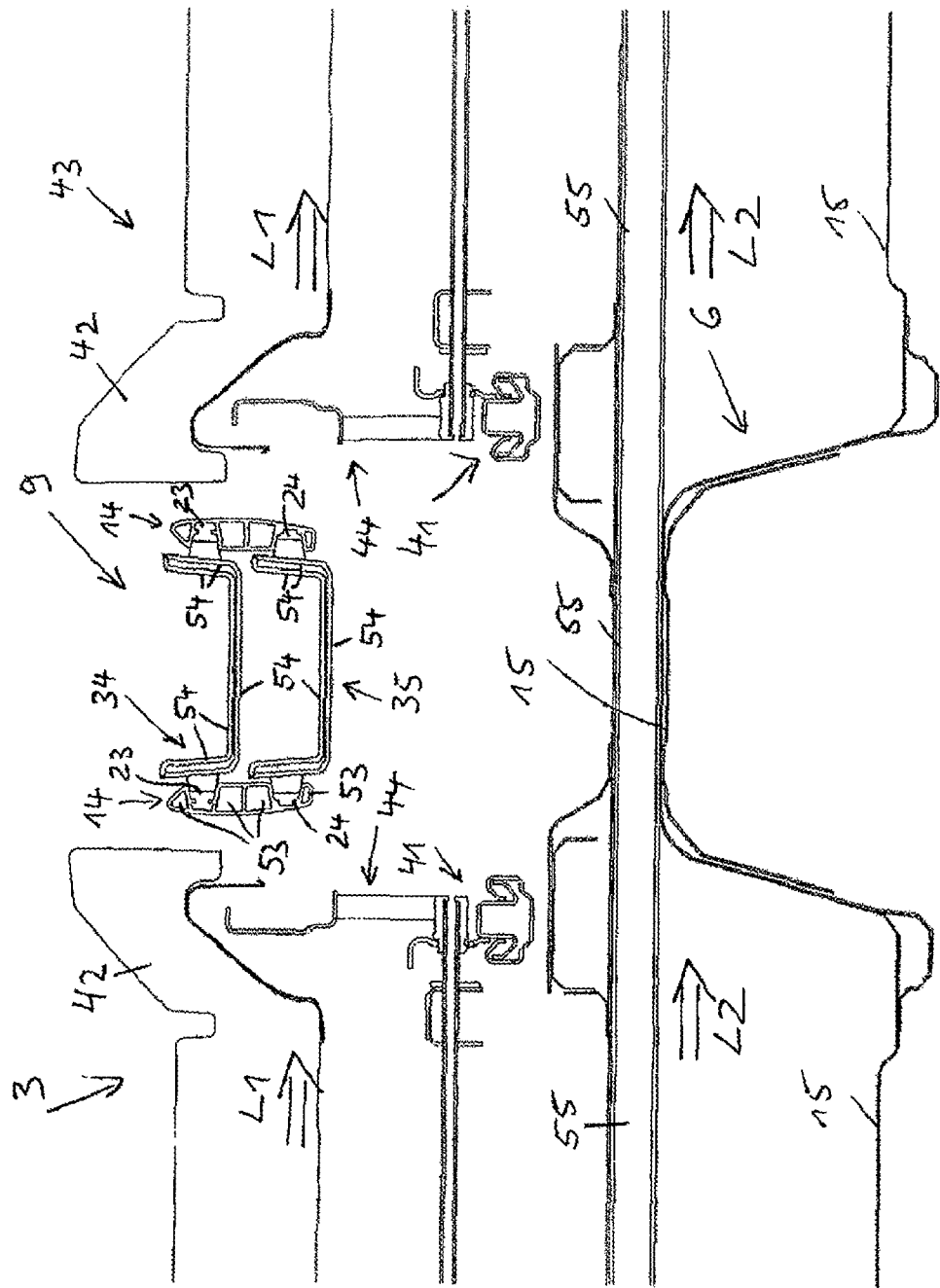
FIG. 18 shows an illustration of the configuration of the rails having inserts retained therein between driver seat and passenger seat, in section in the area of a seat support.

The embodiment according to FIG. 16 through FIG. 18 illustrates the floor 15 in the area of the central tunnel 6. The seat rails 41 facing toward the console, the areas of the lateral seat bulges 42 of driver seat 3 and passenger seat 43 facing toward the area of the console 9, and the seat crossbeam 55 for accommodating the two seats 3 and 43 are illustrated therein. The internal support structure of the two seats 3 and 43 in area of the cited seat bulges 42 is identified by the reference numeral 44. The two rails and/or brackets 14 are connected in the area of their rear ends to a bearing plate 45, which is connected to the floor 15. The freestanding rails 14 are mounted in the area of their front ends in a retainer 46 for the dashboard of the vehicle. This retainer 46 comprises an instrument crossbeam 47 and a crash support 48, which is connected to the floor 15. In the retainer 46, specifically the crash strut 48, a two-part bearing element 49 is mounted. Its one bearing element part 50 is connected to the crash strut 48 and its other bearing element part 51 is connected to the two brackets 14. The two bearing element parts 50 and 51 are connected to one another using a screw connection 52, the bearing element parts 50 and 51 being able to be oriented to one another perpendicularly to the longitudinal extension of the rails 14 in the two coordinate directions, in the Y and Z directions. This allows the rails 14 and thus the console 19 to be oriented laterally and in height in relation to the dashboard. After the orientation of the two bearing element parts 50, 51 to one another, they are connected fixed to one another by tightening the screw connection 52.

The two rails 15 have a hollow chamber profile; the diverse internal passages of the particular rail are identified by the reference numeral 53. The two inserts 34, 35 accommodated by the rails 14 are implemented as double-walled, the particular insert being represented as a shell, the wall areas 54 of the double-walled inserts 34 or 35 being situated at a distance to one another. A high deformation stability of these components results because of the profiling of the rails 14 and the inserts 34, 35. As a result and because of the configuration of the rail pair and the inserts 34, 35 between the seats 3 and 4, during a side crash, a load path L1 for forces introduced into the vehicle during a side crash results at least through the seat facing toward the crash side of the vehicle, in the present case the driver seat 3, for example, and also the rails 14 and the inserts 34 and 35. This load path L1 is thus formed adjacent to the load path L2 of the floor group and in particular of the seat crossbeam 55.

In contrast, during a frontal crash, the rail pair formed by the rails 14 forms a load path L3 between the retainer 46 and the area of the floor 15 facing toward the rear end of the rails 14. This load path L3 is thus active in addition to the load path L4 of the floor group of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A console for a vehicle having a floor a driver seat and a passenger seat, comprising
    a first rail having a first guide;
    a second rail having a second guide, wherein the first rail and the second rail are implemented as freestanding brackets, the brackets are adapted to be mounted at least in the floor of the vehicle, the first guide and the second guide are configured to accommodate inserts between the first guide and the second guide; and
    a storage space between the inserts and the floor of the vehicle, wherein the storage space is configured to be accessible from the drivers seat beneath the first rail, from the passenger seat beneath the second rail, and from above between the first rail and the second rail,
    wherein the first rail and the second rail are mounted in an area of a rear end in the floor of the vehicle and are mounted in a retainer for the dashboard of the vehicle, the first rail and the second pair forming a load path (L3) between the retainer and the floor during a frontal crash.

2. The console according to claim 1, wherein the at least one of the freestanding brackets has at least two guides situated one above another for accommodating inserts in a plurality of levels.

3. The console according to claim 1, wherein a guide is open in an upper end area of a bracket.

4. The console according to claim 1, further comprising a means for locking the inserts in relation to the guides.

5. The console according to claim 1, wherein the freestanding brackets comprise a metal.

6. The console according to claims 1, wherein the freestanding brackets are connected to the floor of the vehicle in an area of a central tunnel of the vehicle.

7. The console according to claim 1, wherein the freestanding brackets are mounted in a retainer for a dashboard for paneling of a lever of the vehicle in an area of bracket ends facing toward the dashboard.

8. The console according to claim 1, further comprising a base support mounted in the floor.

9. The console according to claim 8, wherein the base support is connected to a central tunnel of the vehicle.

10. The console according to claim 8, wherein the base support is provided with receptacles on a top side with a storage space formed between the receptacles and the inserts inserted into the freestanding brackets.

11. The console according to claim 8, wherein the base support is used on a bottom side as at least one receptacle space for components running along the floor in particular in the area of the central tunnel.

12. The console according to claim 8, wherein the base support extends from the dashboard up to a rear seat of the vehicle.

13. The console according to claim 8, wherein the base support is designed as a multipart, the parts of the multipart of the base support situated one behind another in the longitudinal direction of the vehicle.

14. A console for a vehicle having a floor a driver seat and a passenger seat, comprising
 a first rail having a first guide;
 a second rail having a second guide, wherein the first rail and the second rail are implemented as freestanding brackets, the brackets are adapted to be mounted at least in the floor of the vehicle, the first guide and the second guide are configured to accommodate inserts between the first guide and the second guide; and
 a storage space between the inserts and the floor of the vehicle, wherein the storage space is configured to be accessible from the drivers seat beneath the first rail, from the passenger seat beneath the second rail, and from above between the first rail and the second rail,
 wherein the first rail and the second rail are situated between a seat of the vehicle and during a side crash, a load path (L1) for forces introduced into the vehicle during the side crash is formed at least by the seat facing toward a crash side of the vehicle, the first rail, the second rail, and at least one of the inserts.

15. The console according to claim 14, wherein at least the seat form part of the load path (L1).

16. The console according to claim 14, wherein at least one of the first rail and the second is implemented as a chamber profile.

17. The console according to claim 14, wherein the insert is double-walled.

18. The console according to claim 17, wherein the insert is implemented as shell-shaped, wall areas of the double-walled.

19. The console according to claim 1, wherein the first rail and the second rail are mounted using a two-part bearing element in the retainer, the two bearing element parts of the bearing element, which are connected to one another, being able to be oriented in two coordinate directions to one another.

20. The console according to claim 19, wherein the two bearing element parts may be oriented to one another in the two coordinate directions perpendicularly to the longitudinal extension of the rails.

21. The console according to claim 1, wherein the at least one of the first rail and the second rail is implemented as a chamber profile.

* * * * *